(No Model.)
J. T. SMITH.
PACKING.
No. 451,008. Patented Apr. 21, 1891.
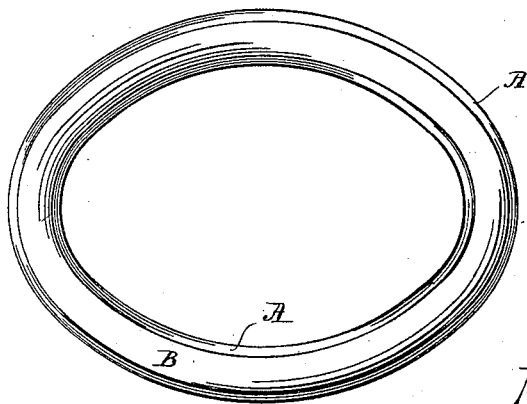
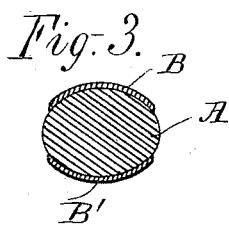
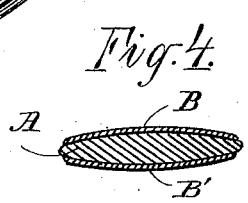
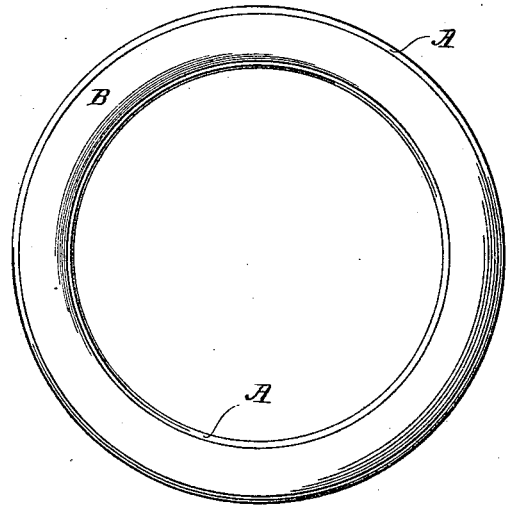
Witnesses.
Inventor.
John T Smith
by A. H. Ste Marie
atty

UNITED STATES PATENT OFFICE.

JOHN T. SMITH, OF SAN FRANCISCO, CALIFORNIA.

PACKING.

SPECIFICATION forming part of Letters Patent No. 451,008, dated April 21, 1891.

Application filed June 28, 1890. Serial No. 357,131. (No model.)

*To all whom it may concern:*

Be it known that I, JOHN T. SMITH, a citizen of the United States, and a resident of the city and county of San Francisco, State of California, have invented a new and useful Improvement in Packing, of which the following is a specification.

My invention relates to packing used for the joints of man-hole or hand-hole plates, flanged pipes, cylinder-covers, and other parts of engines or conduits where tight joints are of importance; and its object is to provide a better and more convenient packing than has until now been employed for a like purpose. The chief difficulty in rendering joints of this nature perfectly tight lies in that the parts brought together are more or less uneven of surface and seldom truly parallel. The space left between the united pieces is therefore irregular and calls for a packing of irregular shape. To be uniformly adaptable, such a packing has to possess enough plasticity to fit interstices of variable dimensions, and at the same time be sufficiently elastic to expand in proportion as the parts relax. Packings possessed of these qualities, however, are injured by extremes of temperature, especially heat, and for that reason lack the desired durability.

My improvement consists of peculiar details of fabrication, through which not only is this latter property secured, but also a more thorough application of the packing, as will be pointed out hereinafter.

Referring to the drawings herewith, which form part of this specification, Figure 1 is a plan of my improved packing complete, in the form used for the joints of man-hole plates and the like; Fig. 2, a similar view of the packing used for the joints of flange-pipes, &c.; Fig. 3, an enlarged cross-section taken from Fig. 1, and Fig. 4 an enlarged transverse section from Fig. 2.

The same parts are designated by the same letters of reference throughout the several views.

The letter A represents the body of my improved packing, which consists of a strip of some soft, pliable, and elastic material, preferably vulcanized india-rubber or cork. It is necessary that the packing be soft, to readily yield under pressure and bed itself into all the cracks and depressions of the surfaces between which it is laid. It must be pliable to stand the twisting consequent upon the uneven setting of the parts, and, lastly, it has to be elastic to bear contraction and expand as the variations in the space filled may demand. These prerequisites of a good packing are found in a suitable degree in india-rubber and cork, and render them superior for the end in view to lead, pasteboard, cotton, putty, and similar substances ordinarily used for pipe and other joints. India-rubber and cork are nevertheless injured by heat and frost, especially the former, and to guard against this I insulate the strip A by means of two bands of incombustible material B B', which I put over each of its larger surfaces. These bands must be as soft and pliable as the strip A not to interfere with its proper working, but they may well be devoid of its elasticity, since their lack of it will tend to preserve their thickness unaltered when under compression.

Various substances may be employed to constitute the bands B B'; but I have found that asbestus or hemp paper produce the best results, and therefore prefer their use. The strip A should not be fully covered with the bands, as otherwise it would be so bound up as to have its usefulness partly destroyed. By leaving its edges free, however, it is afforded ample opportunity to spread out, and yet sufficiently protected from contact with the metallic pieces inclosing the space packed.

Form is an important factor in a packing, owing to the inequalities of surface of the united pieces, and as a rule a packing should be varying in thickness, and thus given a chance to adapt itself to the variable space left between the joints and fill it up adequately at every point. The oval form shown at Fig. 3 and the lenticular shape illustrated in Fig. 4 are the most suitable, the former being fit for man-hole plates and like devices, and the latter for flange-pipes, couplings, &c. Another advantage of the elliptical and convex-lens forms is that they will withstand a second compression—that is to say, they can be used a second time—whereas packings of other shapes are wanting in this respect.

My improved packing may be drawn out in a straight line or in circles, ovals, or any other figures best suited to the parts it is applied to; but it should be made of a continuous piece, whenever practicable, as this insures a greater cohesiveness. It is applicable to man-hole plates and flange-pipes, as above mentioned, and it can be used also for stuffing the joints of hydraulic machinery, pumps, cylinder-heads, and other parts of steam and other engines, and, in fact, wherever an efficient, handy, and durable packing is desired.

I aware that Patent No. 63,073, dated March 19, 1867, granted to James P. McLean, shows and describes a packing composed of cork, with or without an india-rubber diaphragm, having a coating of asbestus or other non-combustible material. I am also aware that Patent No. 242,133, dated May 31, 1881, granted to Charles Jenkins, shows and describes a packing consisting of a vulcanizable or vulcanized compound consisting of heat-resisting or refractory matter surfaced with soft metal, wood, or other suitable material; and I am further aware that Patent No. 326,594, granted to William T. Y. Schenck September 22, 1885, shows a rubber packing having its sides faced with cloth. I therefore do not make claim to the inventions covered by these patents; but What I do claim, and desire to secure by Letters Patent, is—

The combination, with the body of a packing consisting of india-rubber and cork, thicker at the center of its larger surfaces than at the edges thereof, of insulating-bands of soft, pliable, but inelastic and incombustible substance placed over each of the larger surfaces of the body of the packing upon the opposite faces, so as to leave the edges of said packing free, substantially as set forth.

In testimony whereof I have hereunto set my hand and seal.

J. T. SMITH. [L. S.]

In presence of—
R. R. STRAIN,
CHAS. D. WHEAT.